April 16, 1963    R. J. TOLMIE    3,086,133
MOTOR FOR LADIES' SHAVERS
Filed Dec. 23, 1957
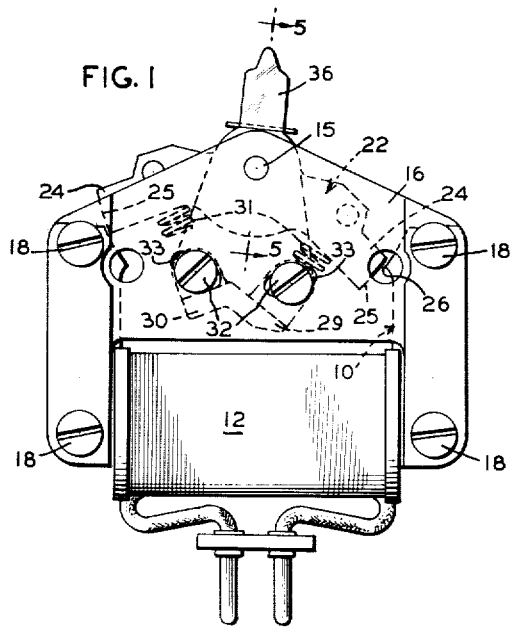
FIG. 1
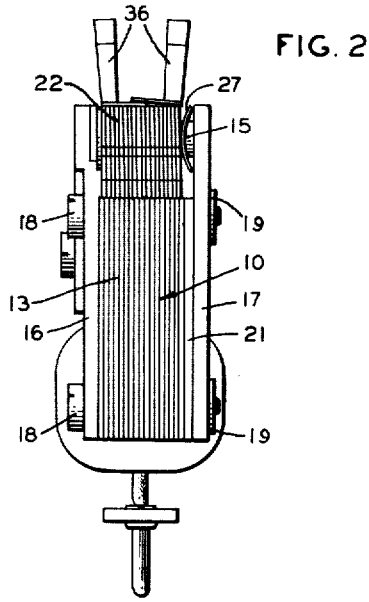
FIG. 2
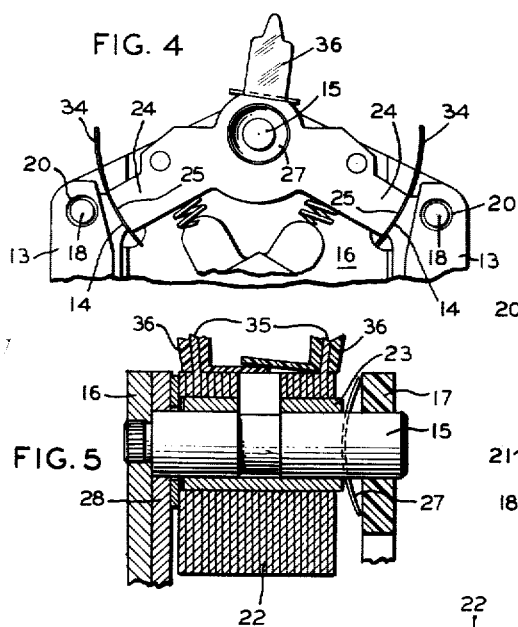
FIG. 4
FIG. 5
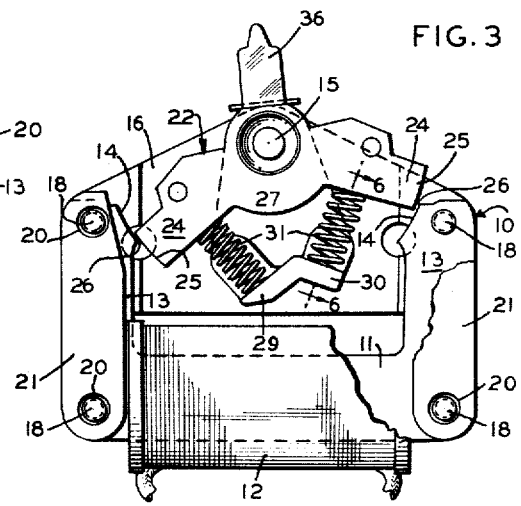
FIG. 3
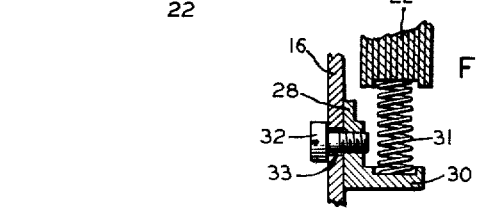
FIG. 6
INVENTOR
ROBERT J. TOLMIE
BY
ATTORNEY United States Patent Office 3,086,133
Patented Apr. 16, 1963

1

3,086,133
MOTOR FOR LADIES' SHAVERS
Robert J. Tolmie, Fairfield, Conn., assignor to Sperry Rand Corporation, New York, N.Y., a corporation of Delaware
Filed Dec. 23, 1957, Ser. No. 704,639
4 Claims. (Cl. 310—36)

This invention relates to new and useful improvement in motors for shavers.

An object of the invention is to provide a simple and efficient mechanism whereby the air gap between a vibratory armature and associated pole faces of a stator element may be easily and quickly adjusted to a desired amount.

A further object is to provide a simple and efficient mechanism whereby the normal and initial degree of entry of the armature pole faces with respect to the faces of the stator element poles may also be easily and quickly determined as desired.

A still further object is to provide simple and efficient mechanism whereby the thrust of forces on the supporting shaft of an armature vibrating at high speed may be more effectively balanced so that the device operates much more quietly and with greatly reduced wear on the armature bearing.

A further object is to provide a simple and efficient mechanism whereby the adjustment for the degree of entry and the air gap between the armature poles and the stator element poles may be separately and independently adjusted.

Further and more specific objects, features and advantages will more clearly appear from a consideration of the specification hereinafter set forth when taken in connection with the accompanying drawings which form part of the specification and which illustrate a present preferred form of the invention.

In brief and general terms, the invention relates to a motor of the type in which there is a U-shaped stator element on the base of which is disposed an energizing coil. The upper ends of the legs of the stator element have arcuate poles, the surfaces of which face each other. Preferably the stator element is formed of a series of laminated plates. An elongate vibratory armature is disposed to oscillate between the poles of the stator element.

With this basic form of magnetic unit, the invention includes a frame adjustably fastened to the stator element and adapted to be adjusted slightly longitudinally of the legs of the stator element. Near the top of this frame is fixed a shaft above the poles of the stator element and equidistant from the pole faces. This shaft is the center of a circle of which the pole faces are arcs.

On the shaft is oscillatably mounted the elongate armature the opposite ends of which are formed with pole faces of the same curvature as the pole faces of the stator element. The armature is connected to the shaft at its midpoint. Preferably the armature slopes downwardly slightly on each side of the mid-point. By adjusting the frame on which the armature shaft is fixed, the gap between the stator element pole faces and the armature pole faces may be finely adjusted.

Another feature of the invention is a bracket plate pivotally mounted at its upper end on the shaft which supports the armature. This plate extends downwardly and has on its lower end inwardly directed flanges. A pair of springs, which are substantially of equal strength, extend between these flanges and the respective portions of the armature between the pole faces and the supporting shaft, and the direction of these springs is generally at right angles to the length of the armature at the point of contact. The bracket plate is disposed adjacent a frame plate and set screws on the bracket extend through elongate holes in the frame plate to permit the bracket to be swung into a desired position and fastened therein whereby the normal initial position of the armature with respect to the stator element pole faces may be predetermined. This initial position determines the degree of entry of the armature pole with respect to the stator element pole and is ordinarily called the "entry gap."

It will thus be seen that there is a stator element having poles, an armature having poles to be related to the poles of the stator element and means for supporting the armature for oscillation between the stator element poles, and means for adjusting the support on the stator element so as to vary the polar relation between the stator element and the armature at will.

It will also be observed that as the armature is attracted by the magnetic flux of the stator element and oscillates the motion downwardly of its limbs on each side of the pivot shaft will be opposed by respective compression springs the resistance of which is in line substantially opposite to the line of magnetic pull on the ends of the armature. The disposition of the direction of magnetic pull and spring resistance in opposite direction will tend to make the vibration of the armature quieter and will more effectively balance the stress of lateral thrust on the supporting shaft and the bearing on which the armature is mounted thus insuring longer wearing qualities. The springs act to retain the inner surface of the armature bearing opening at the side adjacent the springs in constant bearing contact with one side of the armature shaft in obtaining this quiet operation.

It will be furthermore observed that the springs resisting the motion of the armature are mounted on an adjustable bracket so that the initial position of the armature with respect to the stator element poles may be readily predetermined.

A present preferred form which the invention may assume is illustrated in the drawings of which FIG. 1 is a front elevation of the motor unit;

FIG. 2 is a side elevation thereof;

FIG. 3 is a rear elevation with parts broken away;

FIG. 4 is a view of the upper end of FIG. 3 showing the armature in a position to permit adjustment of the armature gap;

FIG. 5 is a cross section taken on the line 5—5 of FIG. 1; and

FIG. 6 is a partial cross section taken on the line 6—6 of FIG. 3.

Referring now to the structure of the present preferred embodiment of the invention shown in the drawings, it will be noted that there is a main stator element core of U-shape formed of a series of laminated sheets 10 and having a base portion 11 on which is disposed an energizing coil 12. The legs 13 of the stator element are well spaced apart and have pole faces 14 of arcuate shape which slope downwardly and inwardly toward each other.

The curvature of the pole faces 14 is the arc of a circle the center of which is coincident with the axis of a shaft 15 fixedly mounted between frame plates 16 and 17, the former a metal plate and the latter a plate of insulation. These plates 16 and 17 are bolted to the opposite sides of the stator element by means of four bolts 18 provided with cooperating nuts 19. The bolts 18 pass rather snugly through holes in the stator element but pass through holes 20 in the plates 16 and 17 which are larger in diameter than the diameter of the bolts. This difference in diameter will permit the plates 16 and 17 to be shifted slightly with respect to the stator element for a purpose to be later described. However, when the bolts are tightened up the plates are held in any thus adjusted position. Washers of insulation 21 are disposed between the plate 17 and the legs 13 of the stator element as clearly shown in FIG. 3. In order to finely adjust the gap 26, the device is placed in another suitable jig and the armature therein disposed in the position shown in FIG. 4 in which the stator element and the armature pole faces are in completely overlapped relation. The bolts 18 are loosened, the pair of plates 16 and 17 together with the armature are moved up slightly with respect to the stator element and a pair of shims 34, FIG. 4, are slipped in between the respective adjacent pole faces. The plates are then moved down until the armature pole faces are pressing firmly against the shims. The bolts are then tightened and the shims are pulled out leaving a gap of the required dimension. Shims of the order of .003 inch have been used to produce a required gap to work satisfactorily. It will be noted that the adjustment for the gap 26 and the adjustment for the normal degree of entry can be made entirely separate from each other.

A vibratory armature formed of a series of laminated sheets 22 is pivotally mounted on the shaft 15 by means of an oilless type bearing sleeve 23 to which it is fixed by any suitable means (not shown). This armature is formed as downwardly and outwardly extending arms 24 the outer ends of which 25 are arcuate and act as the armature pole faces. The curvature of the arc of these faces is the same as that of the pole faces 14 of the stator element above mentioned but spaced therefrom by a suitable gap 26. Thus it is seen that the armature pole faces 25, in the position thereof shown in FIG. 4, slope downwardly and inwardly as do the faces 14 of the stator element poles. As shown in FIG. 5, a curved ring washer 27 is disposed between the bearing sleeve 23 and the inner face of the insulating plate 17.

Disposed against the inner face of the magnetic plate 16 is a bracket plate 28 supported on the shaft 15 and having a dependent portion with flanges 29 and 30 formed at the lower end thereof and bent at right angles thereto. These flanges are disposed at an angle to each other and act as supporting plates for the lower ends of springs 31 which extend from these supports upward to bear against the lower faces of the respective arms 24 of the armature as clearly shown in FIG. 3. It will be noted that the normal direction of the springs are at right angles to the normal length of the respective arms of the armature. These springs maintain the inner surface on one side of bearing sleeve 23 in constant engagement with shaft 15 to take up all clearance, which eliminates vibration of the armature on shaft 15 and results in quieter motor operation. A pair of adjusting screws 32 are connected to the lower portion of the bracket plate 28 and extend through slightly elongate slots 33 in the plate 16. By reason of these elongate slots the bracket plate 28 may be shifted slightly around the shaft 15 to adjust the position of the flanges on its lower end with respect to the arms of the armature. When the proper or desired position is obtained the screws are tightened up.

It is generally desirable to dispose the armature with its arms in the position shown in FIG. 3 with the power off. In this position it will be seen that the leading edge of each armature pole face is slightly overlapping the respective adjacent pole face of the stator element. This overlap may be designated as the normal degree of entry. To set the armature to this normal position, the device is put into a suitable jig and the armature is rotated until a dial on the jig indicates the achievement of the desired position. While this is being done, the screws 32 are loosened and, when the desired position is reached, the screws are tightened. Since the springs 31 are substantially of the same strength, this operation will dispose the springs and their supporting flanges in the position shown in FIG. 3. This degree of entry may be preferably about .020 plus or minus .005 inch. The proper adjustment of the pole faces results in obtaining the maximum efficiency as regards power and magnitude of stroke.

Springs 31 in taking up clearance between the armature and shaft 15, maintain a uniform gap between the pole faces which may be adjusted so the gap is less than otherwise required. This co-operation obtains increased efficiency and quieter operation.

It is also to be noted that there are two drive arms for this motor and they are formed by having integral upwardly extending fingers 35 struck up from two of the laminae of the armature as shown in FIG. 5. These fingers are covered by sleeves 36 of suitable insulating material.

While I have described what I consider to be a highly desirable embodiment of my invention, it is obvious that many changes in form could be made without departing from the invention and I, therefore, do not limit myself to the exact form herein shown and described, nor to anything less than the whole of my invention as hereinbefore set forth and as hereinafter claimed.

What I claim as new is:

1. In a shaver motor having a U-shaped stator element having spaced legs with pole faces at the ends thereof, and with an oscillatable armature pivoted at its midpoint on a fixed shaft and disposed between the stator element pole faces, the outer ends of the armature formed with cooperating pole faces, a bracket member pivoted to the shaft, and a pair of springs supported at one end to the bracket and extending divergently upward to the under faces of the armature on respective sides of the pivot point, and means to adjust the bracket around the shaft to adjust the normal position of the armature pole faces with respect to the stator element pole faces.

2. The invention of claim 1 in which the bracket member has flanges at its lower portion extending inwardly and on which the lower ends of the springs rest, a plate to which the shaft is fixed, adjustable set screws on the bracket plate extending through elongate holes in the plate whereby the angular position of the bracket may be predetermined.

3. A shaver motor comprising a U-shaped stator, a vibratory armature extending between the ends of the stator, supporting means on the stator mounting said armature to rotate about an axis intermediate the ends thereof, a member adjustably mounted on said supporting means for movement relative to said axis, a pair of springs having one end of each cooperating with said member and the opposite ends extending in the same direction from said member toward said armature and engaging the same side of said armature, one spring cooperating with said armature on one side of said axis and the other spring cooperating with said armature on the other side, and means for normally retaining said member in adjusted position, whereby said springs normally support said armature in a central position for vibratory movement and take up lost motion between said armature and mounting to eliminate noise and adjustment of said member adjusts the position of said armature ends relative to the ends of said stator.

4. A shaver motor comprising a U-shaped stator, a vibratory armature extending between the ends of the stator, frame plates mounted on opposite sides of said stator, a shaft mounted in said frame plates in transversely extending relation between the ends of said stator, a vibratory armature extending between the ends of the stator and having the central portion mounted on said shaft, a bracket plate pivoted on said shaft at one end adjacent one of said frame plates, a flange on the opposite end of said bracket plate, a pair of compression springs extending in adjacent relation between said flange and armature, and having opposite ends cooperating with said flange and armature, one of said springs cooperating with the armature at the opposite side of the shaft from the other, and means for retaining said bracket plate in adjusted position on the frame plate for normally retaining said armature in a central position for vibratory movement with the ends in predetermined relation to the ends of said stator, said springs operating to take up lost motion between said armature and shaft and eliminate noise in operation.

References Cited in the file of this patent

UNITED STATES PATENTS

| | | |
|---|---|---|
| 1,733,872 | Graseby | Oct. 29, 1929 |
| 2,238,390 | Knopp | Apr. 15, 1941 |
| 2,827,578 | Carissimi | Mar. 18, 1958 |
| 2,867,737 | Bylund | Jan. 6, 1959 |

FOREIGN PATENTS

| | | |
|---|---|---|
| 750,560 | Germany | Jan. 17, 1945 |
| 594,770 | Great Britain | Nov. 19, 1947 |

UNITED STATES PATENT OFFICE
CERTIFICATE OF CORRECTION

Patent No. 3,086,133                                                    April 16, 1963

Robert J. Tolmie

It is hereby certified that error appears in the above numbered patent requiring correction and that the said Letters Patent should read as corrected below.

Column 3, line 34, for "magnetic" read -- metallic --.

Signed and sealed this 21st day of January 1964.

(SEAL)
Attest:
ERNEST W. SWIDER

Attesting Officer

EDWIN L. REYNOLDS

Acting Commissioner of Patents